(12) United States Patent
Magg et al.

(10) Patent No.: US 7,650,832 B2
(45) Date of Patent: Jan. 26, 2010

(54) COFFEE MACHINE HAVING A DRAWER THROUGH WHICH IT IS SUPPLIED WITH A COFFEE PAD

(75) Inventors: Johann Magg, St. Georgen (DE); Andreas Mayr, Breitbrunn am Chiemsee (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 558 days.

(21) Appl. No.: 10/586,717

(22) PCT Filed: Jan. 26, 2005

(86) PCT No.: PCT/EP2005/050326

§ 371 (c)(1),
(2), (4) Date: Jul. 20, 2006

(87) PCT Pub. No.: WO2005/072574

PCT Pub. Date: Aug. 11, 2005

(65) Prior Publication Data

US 2008/0229932 A1    Sep. 25, 2008

(30) Foreign Application Priority Data

Jan. 30, 2004    (DE) .................. 10 2004 004 819

(51) Int. Cl.
*A47J 31/06*    (2006.01)
(52) U.S. Cl. .................. 99/289 R; 99/295; 99/302 R
(58) Field of Classification Search .................. 99/295, 99/302 R, 289 R, 287
See application file for complete search history.

(56) References Cited

U.S. PATENT DOCUMENTS

| | | | | |
|---|---|---|---|---|
| 3,470,812 A | * | 10/1969 | Levinson | 99/295 |
| 5,111,740 A | * | 5/1992 | Klein | 99/295 |
| 5,794,519 A | | 8/1998 | Fischer | |
| 5,992,298 A | * | 11/1999 | Illy et al. | 99/281 |
| 6,345,570 B1 | * | 2/2002 | Santi | 99/289 R |
| 6,481,338 B1 | * | 11/2002 | Wai | 99/302 R |
| 6,510,783 B1 | * | 1/2003 | Basile et al. | 99/289 R |
| 6,904,840 B1 | * | 6/2005 | Pfeifer et al. | 99/295 |
| 7,237,475 B2 | * | 7/2007 | Chen et al. | 99/302 R |

FOREIGN PATENT DOCUMENTS

| | | |
|---|---|---|
| DE | 196 47 039 | 7/1997 |
| DE | 202 10 980 | 10/2002 |
| EP | 1 050 258 | 11/2000 |
| WO | WO 01/15582 | 3/2001 |
| WO | WO 02/38016 | 5/2002 |
| WO | WO 02/082961 | 10/2002 |

* cited by examiner

*Primary Examiner*—Reginald L Alexander
(74) *Attorney, Agent, or Firm*—James E. Howard; Andre Pallaples

(57) ABSTRACT

A coffee machine having a drawer which can be pushed into the coffee machine in a substantially horizontal manner with the coffee pad inserted therein so as to supply the machine with a coffee pad. In order to provide a simple and reliable possibility for sealing a brewing chamber, actuating means are provided for opening and closing a brewing chamber which is constituted by a brewing chamber upper part and a brewing chamber lower part. In order to give a sealed brewing chamber, at least the brewing chamber lower part or the brewing chamber upper part can be displaced towards the respective other part.

11 Claims, 4 Drawing Sheets

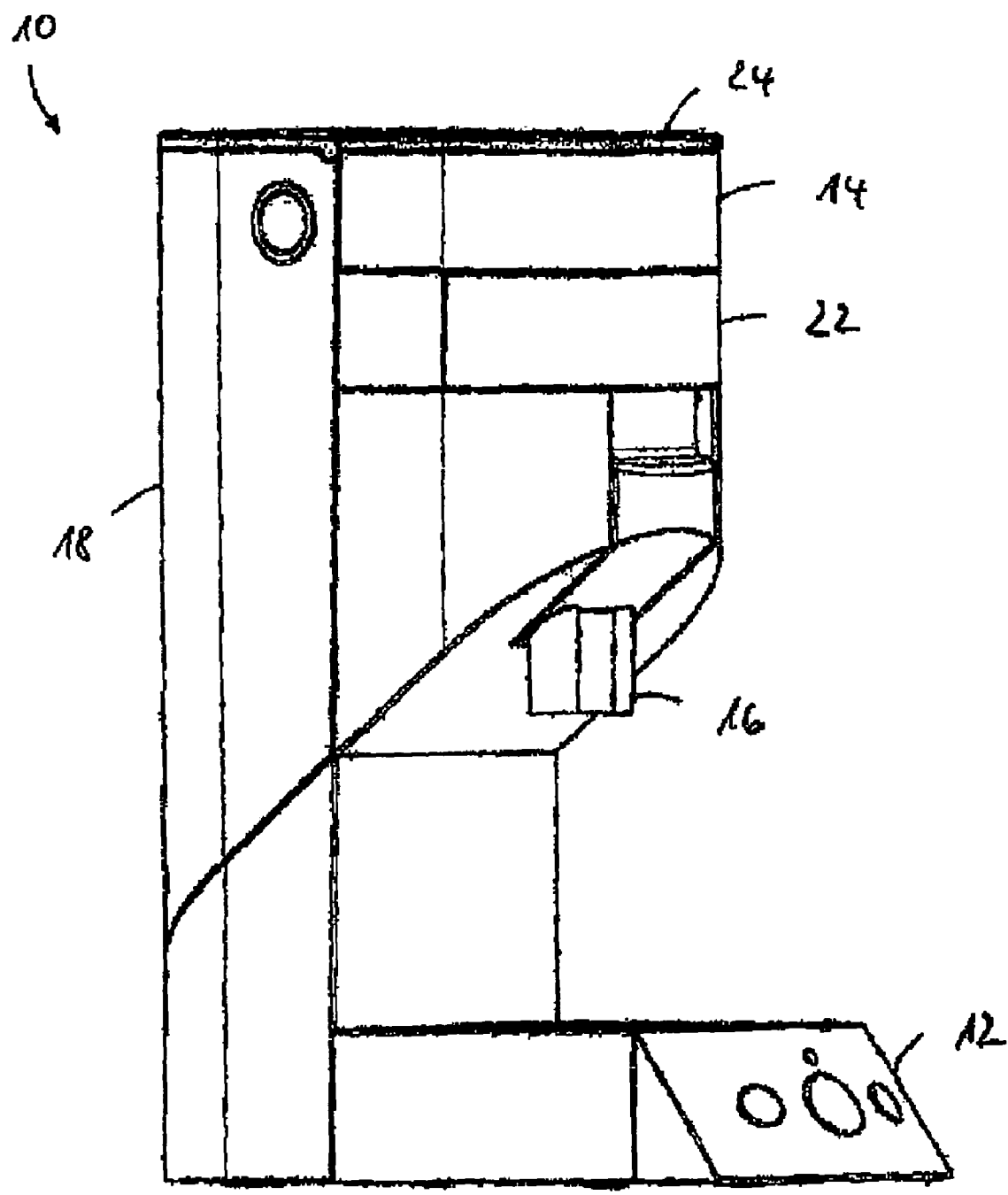

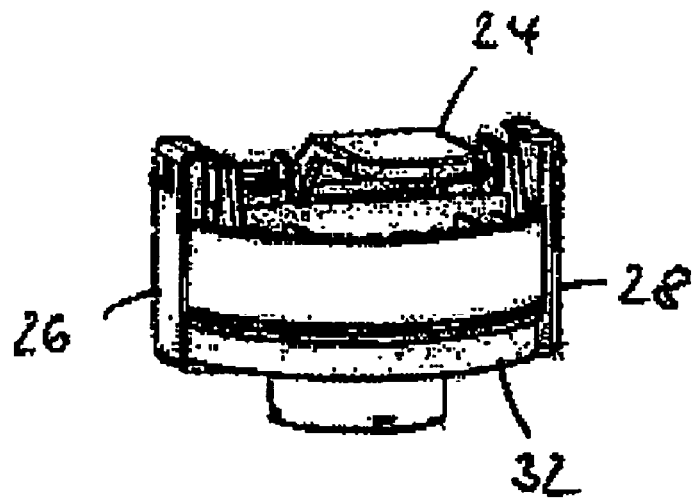
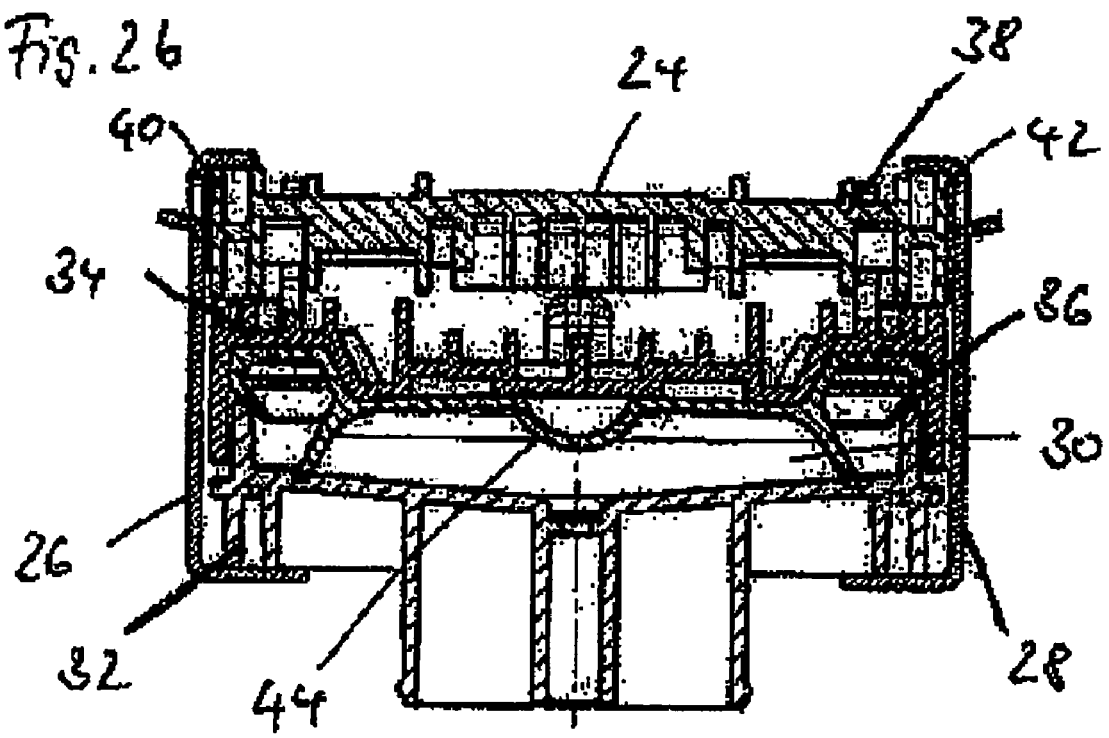

[Fig.]

COFFEE MACHINE HAVING A DRAWER THROUGH WHICH IT IS SUPPLIED WITH A COFFEE PAD

BACKGROUND OF THE INVENTION

The invention relates to a coffee machine.

Coffee machines in the prior art operate according to different principles. The most common models are the so-called pressureless coffee machines. In these water flows from a storage container into an electrically heatable pipe. Particularly as a result of the evolution of steam in this pipe, heated water is then pushed through a riser to an outlet via which the heated water then drips into a coffee filter. The filter coffee can then flow from this coffee filter at atmospheric pressure into a pot.

In contrast, in espresso machines an elevated pressure prevails in the area of the coffee grounds, for example 15 bar. This is achieved by supplying water from a water container or another water supply to an electric-motor-driven pump which then supplies the water at high pressure via an electrically heatable area to a coffee grounds receiving device. This coffee grounds receiving device generally comprises a filter for receiving the coffee. In order to generate the high pressure in the coffee area, during operation the coffee grounds receiving device is located in an area which is sealed towards the atmosphere, which can be designated as a pressure chamber or brewing chamber.

In another coffee machine which operates on a different principle, it is provided to first transfer the water for preparing the coffee from a water container into a heatable intermediate container. From this intermediate container the heated water is passed to an electric-motor-driven pump from which it is supplied at elevated pressure, for example 2 to 3 bar, to a coffee grounds receiving device. In this case, it is provided that unlike in the espresso machine the coffee is not introduced into the coffee grounds receiving device in loose form as coffee grounds but is inserted in a retainer in the form of a coffee pad, that is, in compacted form surrounded by filter paper. The retainer with a retainer cover via which water is supplied can form a sealed pressure chamber. At the same time, the retainer for the coffee pads is allocated a plurality of functions. Firstly, the retainer provides a sealing surface so that a pressure chamber can be formed. Moreover, the retainer has an outlet opening from which the coffee can emerge. Furthermore, the coffee pad should be mounted in the retainer in a manner such that flow through the coffee pad is not impeded. Such a coffee machine occupies an intermediate position between a conventional pressureless coffee machine and an espresso machine.

WO 01/15582 A1 relates to a coffee machine to which the coffee grounds are supplied in the form of coffee pads. The coffee pads are inserted in a lower portion of the brewing chamber and the upper portion of the brewing chamber can be folded onto the lower portion by the user by means of a hinge, wherein an engaging connection between the two housing portions which are hinged relative to one another ensures sealing of the brewing chamber. A problem with this system is that after the brewing process the coffee pad can stick to the upper portion of the brewing chamber when opening the coffee machine. Another problem can arise if the coffee machine is actuated when opened since hot water can then spray in the direction of the user of the coffee machine.

Known from EP 1 050 258 A1 is a coffee machine wherein coffee pads are inserted in a pulled-out drawer and are then brought into the brewing position by pushing in the drawer. For sealing the brewing chamber, a brewing chamber upper portion is automatically moved over the coffee pad from above before the brewing process. After the brewing process, the coffee pads are automatically removed inside the coffee machine in a collecting container. Particularly as a result of the motor-driven components of the coffee machine, this is very complex and therefore expensive to produce.

BRIEF SUMMARY OF THE INVENTION

It is the object of the invention to provide a simple and reliable solution for sealing a brewing chamber.

This object is achieved with the features of the independent claim.

Advantageous embodiments of the invention are given in the dependent claims.

The invention builds on the generic coffee machine in that actuating means are provided for opening and closing a brewing chamber formed by a brewing chamber upper part and a brewing chamber lower part, whereby at least one of the brewing chamber lower part and the brewing chamber upper part can be moved towards the other to form a sealed brewing chamber. The drawer can thus be inserted into the coffee machine in the horizontal direction initially unhindered by sealing means. Afterwards, a preferably vertical adjusting movement independent of the horizontal movement can be accomplished to seal the brewing chamber.

In an alternative of the invention, the brewing chamber lower part can be moved towards the brewing chamber upper part. In this case, the brewing chamber upper part which usually comprises the water inlet and possibly heating means for the pre-heating of the brewing chamber can be arranged fixedly on the coffee machine. A simple configuration of the coffee machine is thereby achieved. No complex and cost-intensive connection of the water inlet or the heating means to a moving brewing chamber upper part is required.

In a second alternative of the invention, the brewing chamber upper part can be moved towards the brewing chamber lower part. In this case, the drawer and the brewing chamber lower part can preferably be constructed in one piece and arranged fixedly on the coffee machine. Any lifting movement between the brewing chamber lower part and the drawer is thereby eliminated so these parts can be configured inexpensively and simply.

In a further alternative of the invention, the brewing chamber upper part and the brewing chamber lower part can be moved towards one another. This yields the advantage that the brewing chamber can be opened very widely in a very short time, making it easier to insert and remove a coffee pad.

The adjusting means can have an electric drive so that the brewing chamber can be opened or closed, for example, merely by pressing a button.

The adjusting means can alternatively or additionally have a mechanical drive. This has the advantage that such a solution can be implemented very inexpensively. This solution is also independent of any electrical power supply.

The mechanical drive can preferably be a lifting mechanism which in particular moves the brewing chamber upper part or the brewing chamber lower part in the vertical direction. The mechanical drive can, for example, take place manually by means of a lever.

It is usefully provided that a coffee pad retainer is located in the drawer and is at least partially encircled, in the pushed-in state of the drawer, by a retaining device which can be displaced substantially vertically by the lever mechanism so that the coffee pad retainer can be lifted with the retaining device and the coffee pad retainer forms the brewing chamber lower part. The drawer can thus remain unchanged in its vertical position after horizontal insertion into the coffee machine. Rather, only one coffee pad retainer disposed in the drawer is raised as the brewing chamber lower part.

In this connection it is useful that the retaining device comprises two clamps which enclose the coffee pad retainer on opposite sides. This is a simple design of the retaining device which additionally allows controlled lifting and thus controlled sealing of the brewing chamber.

The coffee machine according to the invention is advantageously further developed in that each clamp has a continuation at its lower end which applies an upwardly directed force to the coffee pad retainer during lifting of the retaining device. It can also be ascertained here that a particularly simple solution is provided. In particular, it can be provided that the continuations grip underneath the coffee pad retainer. During lowering of the retaining device, the coffee pad retainer is thus transferred into its lowered position through gravity.

It is preferable if the inside of the brewing chamber upper part is made of elastic material. An inner part of the brewing chamber upper part made of silicone, for example, is inexpensive and it can provide a sealing connection to the brewing chamber lower part, preferably made of hard plastic, without the provision of further sealing means.

It is furthermore usefully provided that the lever mechanism is supported with at least two square regions on the brewing chamber upper part, these square regions each being rectangular and having respectively one long and one short side, so that in the lowered state of the retaining device the square regions have one long side resting on the brewing chamber upper part and in the elevated state of the retaining device the square regions have one short side resting on the brewing chamber upper part. By shifting the lever, the entire lever mechanism can thus be raised and lowered by the square regions acting as cams, thus providing a particularly simple implementation of the lever function according to the invention.

It is preferable that in the raised state of the retaining device, the square regions have a short side resting in indentations of the brewing chamber upper part. The lever mechanism thus occupies a stable position in the closed state of the brewing chamber when the brewing chamber upper part is compressed. In particular, this avoids the brewing chamber being unintentionally opened during the brewing process. This is further assisted by the pressure prevailing in the brewing chamber bringing about an improvement in the retention of the short side in the indentation of the brewing chamber upper part during the brewing process.

The invention is based on the finding that reliable sealing of a brewing chamber can be achieved using a manually operated lever mechanism having a simple structure.

In a particularly advantageous embodiment the coffee pad retainer is mounted telescopically on the drawer. By this means the coffee pad retainer is reliably guided in the drawer for raising and lowering. Such guidance which is preferably embodied as telescopic according to the invention can be formed, for example, by two coaxially nested pipe sections on the coffee pad retainer and on the drawer. Such telescopic guidance ensures problem-free raising and lowering of the coffee pad retainer.

BRIEF DESCRIPTION OF THE DRAWINGS

The invention is now explained in detail with reference to the accompanying drawings using particularly preferred embodiments. In the figures:

FIG. 1a is a perspective view of a coffee machine in a first state to explain the invention;
FIG. 2a is a perspective view of a closed brewing chamber;
FIG. 2b is a sectional view of a closed brewing chamber.

DETAILED DESCRIPTION OF THE INVENTION

Figure 1B:
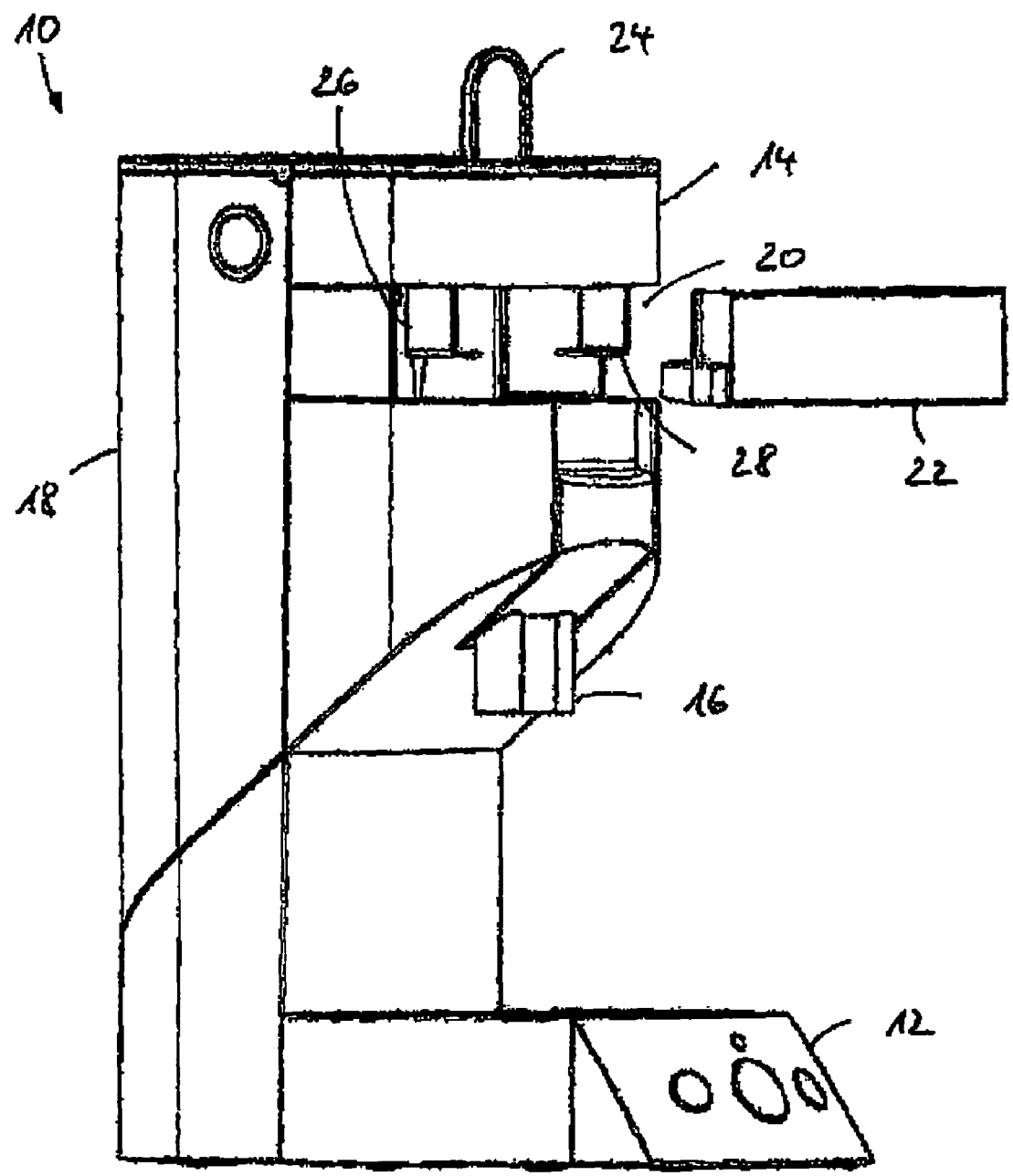
FIG. 1b is a perspective view of a coffee machine in a second state to explain the invention.

FIG. 1a shows a perspective view of a coffee machine in a first state to explain the invention. FIG. 1b shows a perspective view of a coffee machine in a second state to explain the invention. The coffee machine 10 according to the invention comprises a flat front portion 12 and a columnar rear assembly 14. Cups for removing coffee via an outlet 16 can be arranged on the front portion 12. A water container 18 is inserted in the rear assembly 14. The rear assembly 14 further comprises a slide-in area 20 into which a drawer 22 with a coffee pad retainer inserted therein can be slid. The drawer 22 is shown in the inserted state in FIG. 1a and in the removed state in FIG. 1b. Located above the slide-in area 20 inside the housing are a water supply and a retainer cover which together with the retainer sitting in the drawer 22 form the brewing chamber. This is sealed after inserting the drawer 22 by shifting the lever 24 and lifting the clamps 26, 28 hereby effected by pressing together the retainer and retainer cover.

FIG. 2a shows a perspective view of a closed brewing chamber. FIG. 2b shows a sectional view of a closed brewing chamber. The brewing chamber 30 is formed by pressing onto one another a coffee pad retainer 32 acting as the brewing chamber lower part and a brewing chamber upper part 34. The inner side 36 of the brewing chamber upper part 34 facing the brewing chamber 30 is made of an elastic material, for example, of silicone. The brewing chamber 30 is sealed by pressing together this inner side 36 acting as a seal with the coffee pad retainer 32 preferably made of hard plastic. Provided for this purpose are clamps 26, 28 which grip below the coffee pad retainer 32 and rest on the end regions of the lever 24 at their other end. Adjacent to the handle area of the lever 24 is an elongated structure acting as a shaft 38 which has square regions 40, 42 at its ends. These square regions 40, 42 have a long side and a short side, the view of the long side being exposed in the diagram in FIG. 2b. The square regions 40, 42 thus have their short side resting on the brewing chamber upper part 34. In this position, the square regions 40, 42 acting as cams preferably lie in a slight indentation in the brewing chamber 34. In this way, a secure locking of the lever mechanism is provided. This is further assisted by the fact that during the brewing process an excess pressure prevails in the brewing chamber 30, which assists the locking of the square regions in the indentation of the brewing chamber upper part 34.

FIG. 2b also shows a push-off element centrally located on the brewing chamber upper part which is embodied in one piece with the elastic region of the brewing chamber upper part. When the coffee pad is inserted, this push-off element 44 is compressed, so as to avoid any adhesion of the coffee pad to the inner side 36 of the brewing chamber upper part 34 when lowering the coffee pad retainer 32.

Figure 3A:
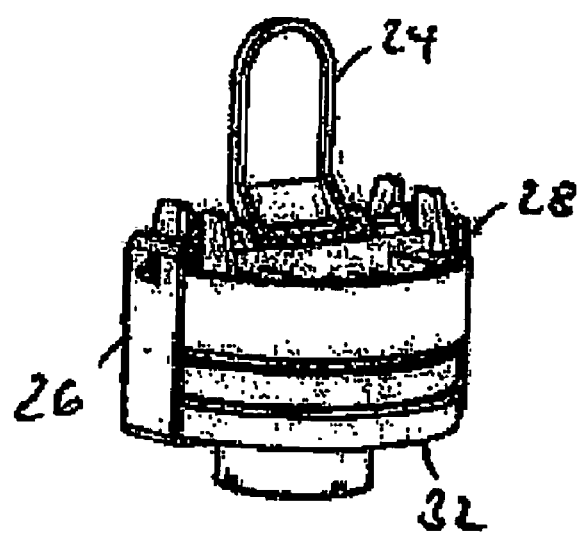
FIG. 3a is a perspective view of an opened brewing chamber.
Figure 3B:
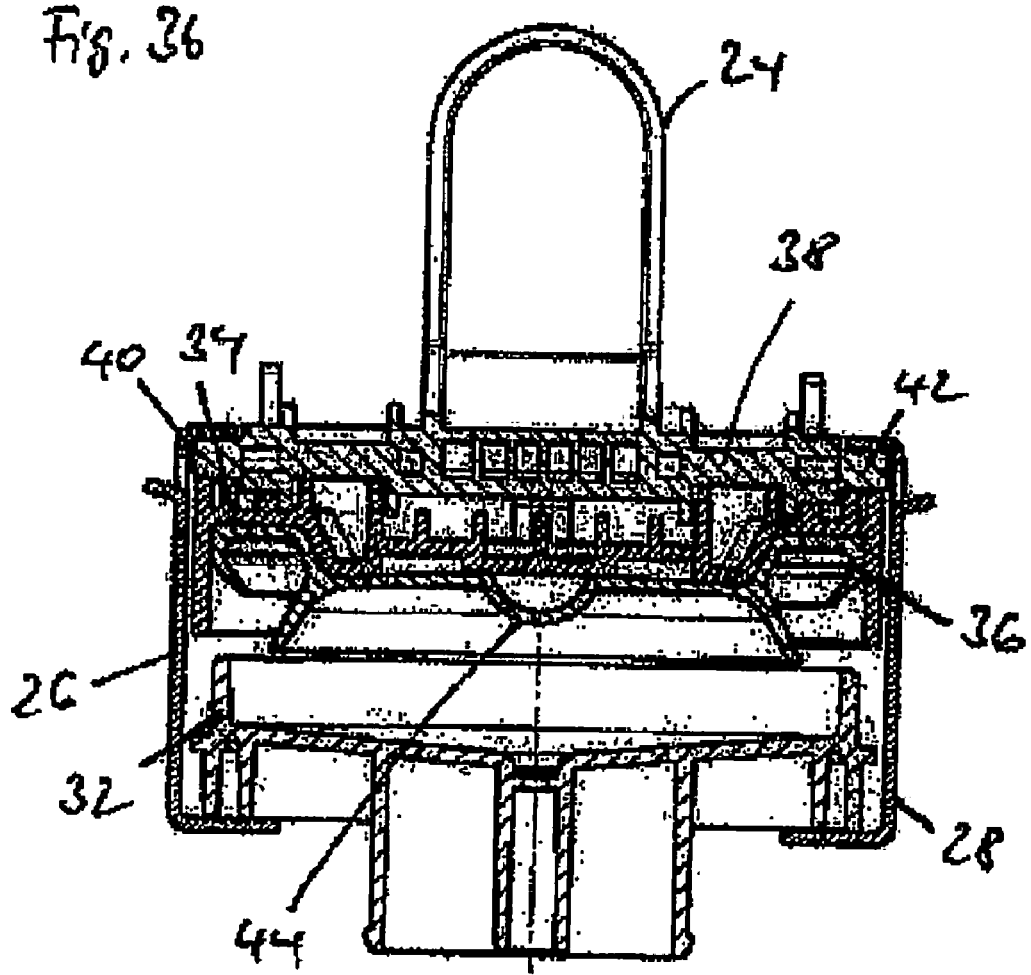
FIG. 3b is a sectional view of an opened brewing chamber.

FIG. 3a shows a perspective view of an opened brewing chamber. FIG. 3b shows a sectional view of an opened brewing chamber. By shifting the lever 24 from the position shown in FIGS. 2a and 2b through 90°, the square regions 40, 42 are likewise turned through 90° by suitably twisting the shaft 38.

Consequently, these now have their long side resting on the brewing chamber upper part 34. In FIG. 3*b* the view of the short side of the square regions 40, 42 is exposed in this respect. Consequently, the clamps 26, 28 and with them the coffee pad retainer 32 are lowered. Starting from this state, the coffee pad retainer 32 together with the drawer 22 (see FIGS. 1*a*, 1*b*) can be removed from the coffee machine to remove the used coffee pad and/or insert a new coffee pad.

The features of the invention disclosed in the preceding description, in the drawings and in the claims can be important for carrying out the invention both individually and also in any combination.

REFERENCE LIST

- 10 Coffee machine
- 12 Front portion
- 14 Rear assembly
- 16 Outlet
- 18 Water container
- 20 Slide-in area
- 22 Drawer
- 24 Lever
- 26 Clamp
- 28 Clamp
- 30 Brewing chamber
- 32 Coffee pad retainer
- 34 Brewing chamber upper part
- 35 Brewing chamber lower part
- 36 Inner side of brewing chamber upper part
- 38 Shaft
- 40 Square region
- 42 Square region
- 44 Push-off element

The invention claimed is:

1. A coffee machine having a drawer for supplying a coffee pad which can be pushed into the coffee machine in a substantially horizontal manner with the coffee pad inserted therein, the coffee machine comprising:

actuating means for opening and closing a brewing chamber formed by a brewing chamber upper part and a brewing chamber lower part whereby at least one of the brewing chamber lower part and the brewing chamber upper part can be moved towards the other to form a sealed brewing chamber, the actuating means comprising a lever mechanism being actuated by a user to move at least one of the brewing chamber lower part and the brewing chamber upper part; and a coffee pad retainer located in a drawer within said brewing chamber and being at least partially encircled, in the closed state of the brewing chamber, by a retaining device being movable in a substantially vertical direction by the lever mechanism between a lowered state and a raised state so that the coffee pad retainer can be lifted with the retaining device and the coffee pad retainer at least partially forms the brewing chamber lower part.

2. The coffee machine according to claim 1, wherein the brewing chamber lower part can be moved toward the brewing chamber upper part.

3. The coffee machine according to claim 1, wherein the brewing chamber upper part can be moved toward the brewing chamber lower part.

4. The coffee machine according to claim 1, wherein the brewing chamber upper part and the brewing chamber lower part can be moved toward one another.

5. The coffee machine according to claim 1, wherein the retaining device comprises two clamps which engage the coffee pad retainer on opposite sides.

6. The coffee machine according to claim 5, wherein each clamp has a continuation at its lower end which applies an upwardly directed force to the coffee pad retainer during lifting of the retaining device.

7. The coffee machine according to claim 6, wherein each clamp has another continuation at its lower end which applies a downwardly directed force to the coffee pad retainer during lowering of the retaining device.

8. The coffee machine according to claim 1, wherein an inner side of the brewing chamber upper portion is formed from a elastic material.

9. The coffee machine according to claim 1, wherein the lever mechanism is supported with at least two square regions on the brewing chamber upper part, these square regions each being rectangular and having respectively one long and one short side, so that in the lowered state of the retaining device the square regions have one long side resting on the brewing chamber upper part and in the elevated state of the retaining device the square regions have one short side resting on the brewing chamber upper part.

10. The coffee machine according to claim 9, wherein in the raised state the square regions have a short side resting in indentations of the brewing chamber upper part.

11. The coffee machine according to claim 1, wherein the coffee pad retainer is mounted telescopically on the drawer.

* * * * *

UNITED STATES PATENT AND TRADEMARK OFFICE
CERTIFICATE OF CORRECTION

PATENT NO. : 7,650,832 B2
APPLICATION NO. : 10/586717
DATED : January 26, 2010
INVENTOR(S) : Magg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 748 days.

Signed and Sealed this

Twenty-third Day of November, 2010

David J. Kappos
*Director of the United States Patent and Trademark Office*